Oct. 7, 1958 H. B. MATTHEWS 2,855,028
RETRACTABLE SEAT BELT
Filed Sept. 6, 1955 2 Sheets-Sheet 1
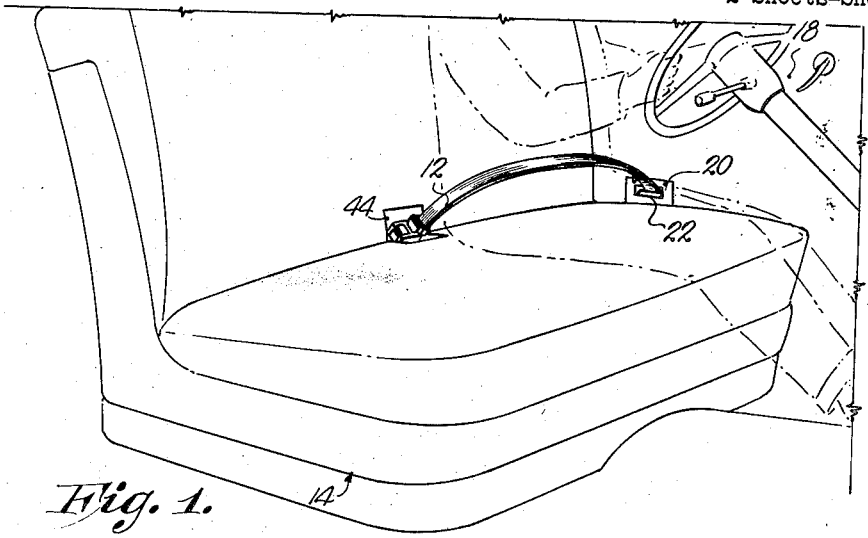
Fig. 1.
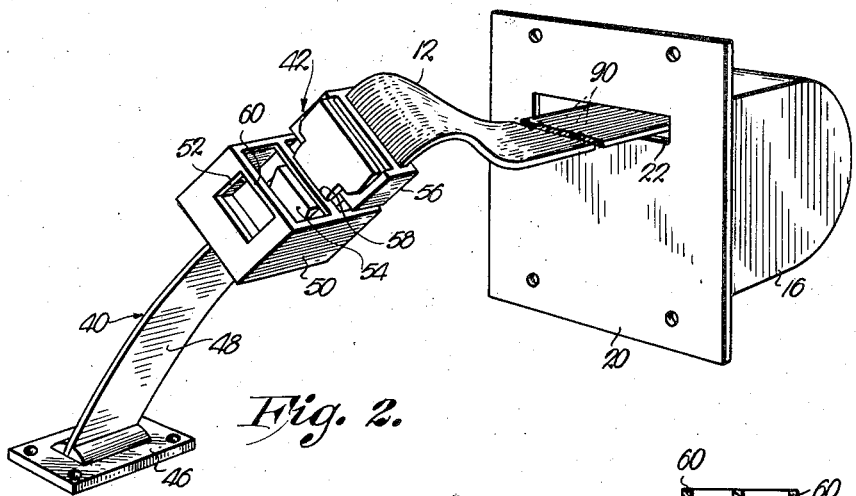
Fig. 2.
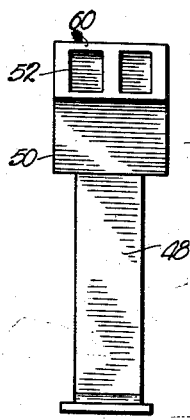
Fig. 3.
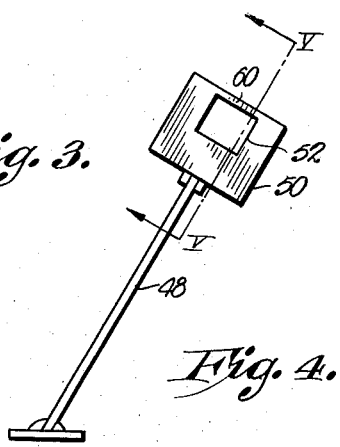
Fig. 4.
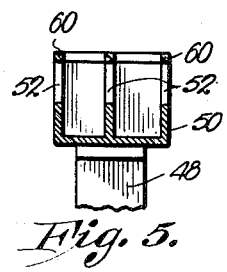
Fig. 5.
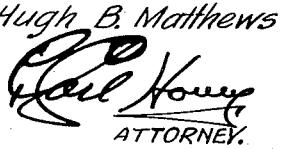
INVENTOR.
Hugh B. Matthews
BY
ATTORNEY.

Oct. 7, 1958  H. B. MATTHEWS  2,855,028
RETRACTABLE SEAT BELT
Filed Sept. 6, 1955  2 Sheets-Sheet 2
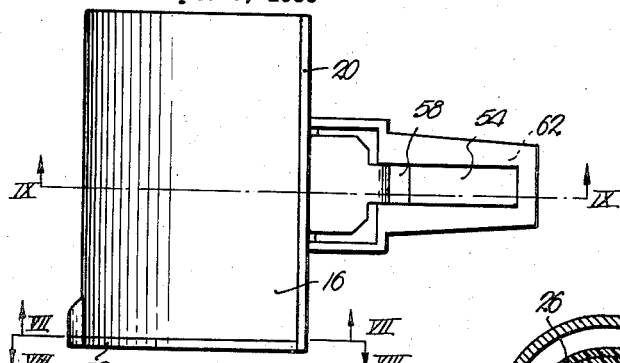
Fig. 6.
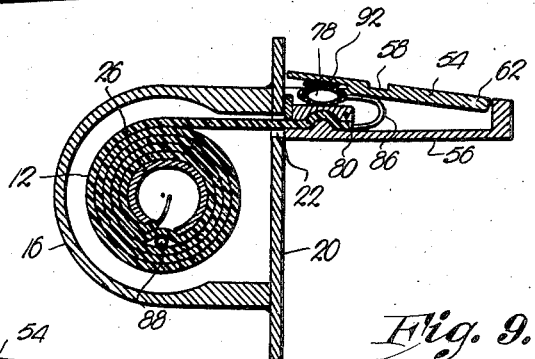
Fig. 9.
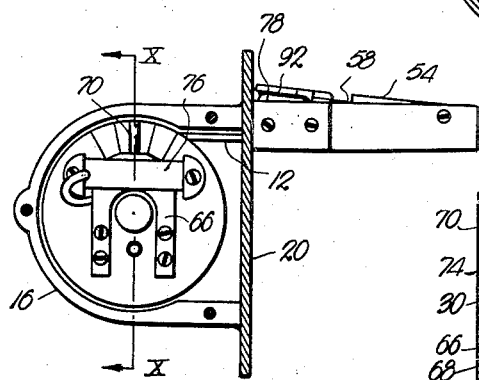
Fig. 7.
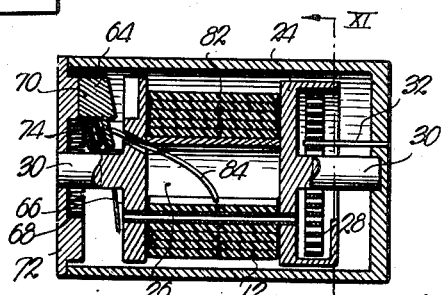
Fig. 10.
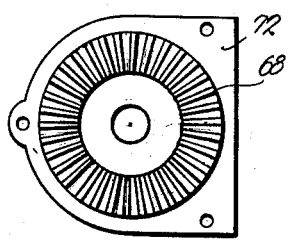
Fig. 8.
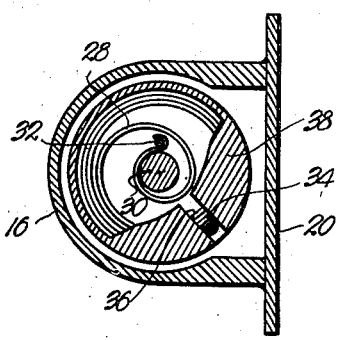
Fig. 11.
INVENTOR.
Hugh B. Matthews
BY
ATTORNEY.

2,855,028

RETRACTABLE SEAT BELT

Hugh B. Matthews, Kansas City, Mo.

Application September 6, 1955, Serial No. 532,632

8 Claims. (Cl. 155—189)

This invention relates to safety apparatus for transportation vehicles particularly automobiles, and has for its primary object the provision of a seat or safety belt assembly having advantageous features for rendering the same attractive to a user whereby to overcome resistance to its use as well as neglect in employment thereof.

It is the most important object of the instant invention to provide a seat belt arrangement that is devoid of the unattractiveness common in devices of this type and which will, therefore, not only be inviting to purchasers, but which will likely be used after installation.

A further object of the instant invention is to provide a safety appliance that is normally housed out of the way, yet easily accessible for latching into an operative position without requiring special skill or undue inconvenience.

A further object of the present invention is to provide a retractable seat belt wound about a reel and which may be pulled to a position across the waist of a user into latched arrangement with a holding member for one end of the belt.

A still further object of the instant invention is to provide a novel locking arrangement for the reel whereby the belt may be maintained taut across the waist of the user and against yielding in the event of a crash or collision.

Another very important object of the instant invention is to provide in a safety device of the aforementioned character, pump means for controlling the lock on the reel disposed for manual manipulation at the time the belt is to be withdrawn and while the latch is manipulated for attaching one end of the belt to the holder.

Other important objects will be made clear as the following specification progresses, reference being had to the accompanying drawings, wherein:

Figure 1 is a perspective view of a retractable seat belt made pursuant to my present invention showing the same in operative use within an automobile.

Fig. 2 is an enlarged perspective view illustrating the belt, the reel housing and the holder, all operably associated together and removed from the automobile.

Fig. 3 is a front elevational view of the holder.

Fig. 4 is a side elevational view of said holder.

Fig. 5 is a fragmentary, cross-sectional view taken on line V—V of Fig. 4.

Fig. 6 is a plan view of the reel housing and the latch secured to one end of the belt.

Fig. 7 is a cross-sectional view taken on line VII—VII of Fig. 6.

Fig. 8 is a cross-sectional view taken on line VIII—VIII of Fig. 6.

Fig. 9 is a cross-sectional view taken on line IX—IX of Fig. 6.

Fig. 10 is a cross-sectional view taken on line X—X of Fig. 7; and

Fig. 11 is a cross-sectional view taken on line XI—XI of Fig. 10.

The single embodiment of the instant invention chosen for illustration in the drawings includes belting 12 adapted to engage across the waist of an occupant of seat 14 in the manner illustrated by Fig. 1 of the drawings and which belting 12 may be retracted into a housing 16 when not in use. In the event a safety belt is employed in an automobile, the housing 16 may be conveniently and desirably secured to door 18 through the medium of escutcheon plate 20 rigid to, or made as a part of the housing 16, plate 20 having a slot 22 for clearing the belt 12. The means for retracting belt 12 into the housing 16 is in the nature of a reel 24 rotatably mounted within the housing 16 and around the hub 26 whereof is wound the belt 12.

Power means for winding the belt 12 onto the hub 26 takes the form of a spring 28 in the housing 16 at one end of the reel 24 and attached to the latter to rotate the same in an anti-clockwise direction viewing Fig. 9. Spring 28 is coiled about one of the trunnions 30 for the reel 24 and has the innermost end thereof secured to a pin 32 extending inwardly from one end of the housing 16. The outermost end of the spring 28 is operably attached to the reel 24 through the medium of a pair of rollers riding in opposed radial slots, one of such rollers 34 being shown in Fig. 11 disposed in a slot 36 formed in an end plate 38.

It is manifest that normally, as the belt 12 is pulled from the housing 16 to an operative position, the tension thereon would become increasingly greater as the spring 28 winds tighter about the trunnion 30. However, by virtue of the provision of slots 36 and rollers 34, the outermost end of the spring 28 moves radially inwardly, thereby relieving the tension on the spring 28 as the belt 12 is pulled and the reel 24 rotated in a direction to unwind the belt 12 therefrom.

The outermost end of the belt 12 is secured to a holder 40 through utilization of a combination latch and lock control 42. Holder 40 is preferably attached to a rigid part of the vehicle such as the frame thereof, rather than to the seat 14 and, to that end, a clearance opening 44 may be provided in the seat 14 as shown in Fig. 1. A base plate 46 forming a part of the holder 40 may be secured to the vehicle frame and an upstanding plate or standard 48 is secured directly to the plate 46.

Standard 48 is preferably made from resilient material, such as metal, plastic or other suitable substance, thereby permitting fore and aft movement of the seat 14 as is quite conventional in modern-day automobiles. Holder 40 includes additionally, a receiver 50 for the unit 42 in the nature of an open top box having a plurality of openings 52, any one of which is adapted to receive a manually manipulable latching member 54 forming a part of the unit 42. When hollow body 56 is inserted into the receiver 50, a notch 58 in the latching member 54, is received by one of the crossbars 60 and the unit 42 is thereby held rigidly attached to the holder 40. Member 54 is swingably secured to the body 56 by a hinge pin 62.

Reel 24 is normally held against rotation within the housing 16 by a lock which includes a pawl 64 mounted on a U-shaped leaf spring 66 straddling the proximal trunnion 30 and having its legs secured to one end of reel 24 by suitable fasteners as seen in Fig. 7. Spring 66 yieldably biases the pawl 64 toward a gear 68 where one or more teeth 70 on the pawl 64 engages or meshes with the teeth of the gear 68, it being understood that gear 68 is formed on one end wall 72 of the housing 16.

The pawl 64 is retracted out of engagement with the gear 68 against the action of spring 66, through the medium of an inflatable bulb 74 interposed between the pawl 64 and a retainer plate 76 secured to the reel 24.

Bulb 74 may be inflated pneumatically by operation of a pump in the nature of a second bulb 78 within the body 56 and disposed between the swingable latch member 54 and a block 80 within the body 56 that serves to clamp the outermost end of the belt 12 to the body 56 therewithin. Bulbs 74 and 78 are operably interconnected by virtue of a longitudinal bore 82 formed in the belt 12 throughout the length thereof and coupled with the bulbs 74 and 78 by flexible tubes 84 and 86 respectively. The innermost end of the belt 12 is secured to the hub 26 of reel 24 by a clamping pin 88.

The belt 12 may take any suitable form but is preferably made from an attractive, lightweight, but exceedingly strong material which will not become soiled over long periods of use. To this end, it is contemplated that a plastic material will be utilized and the bore 82 formed therein at the time of production of the belt 12. The necessary strength may be attained by providing a plurality of parallel, longitudinally extending glass fibers 90 moulded or otherwise embedded in the material from which the belt is formed. In this manner the belt 12 remains highly flexible and pliable and, therefore, capable of being wound tightly about the hub 26 and yet is sufficiently strong to maintain the occupants strapped to the seat 14.

Normally, the belt 12 is wound about the hub 26 with the unit 42 bearing against the outermost face of plate 20 as seen in Figs. 6, 7 and 9 of the drawings. After occupying the seat 14 and closing the door 18, the occupant need merely grasp the unit 42 and depress the member 54 to inflate bulb 74 and thereby release the pawl 64 so that reel 24 will rotate freely and the belt 12 may be withdrawn for attachment to the holder 40. When the member 54 is thus swung inwardly, the bulb 78 is squeezed between the member 54 and the block 80, thereby forcing air therefrom and into the tube 86, bore 82, tube 84 and bulb 74. While the member 54 is thus held, unit 42 may be inserted into the receiver 50 and upon release, notch 58 will lock into one of the bars 60 and thereby attach the unit 42 to the holder 40. Release of the member 54 will cause deflation of the bulb 74 through action of spring 66 and pawl 64 will relock with the gear 68 and prevent further rotation of the reel 24 in either direction. The air exhausted from the bulb 74 will escape from the bulb 78 by virtue of the provision of a small flapper valve 92 between the bulb 78 and the member 54.

When the belt 12 is to be released from the holder 40, the member 54 is again depressed to withdraw the notch 58 from its locking engagement with one of the bars 60. Such depression of the member 54 closes the flapper valve 92 and the pumping action again releases the lock for reel 24 so that the spring 28 will retract the belt 12 back into the housing 16.

Holder 40 is shown as a multi-purpose device in that it is adapted to receive two units 42 when a safety appliance such as above described is also utilized in the opposite door of the vehicle. In the event two additional passengers occupy the seat 14, a single additional belt may be employed to embrace the waist of both of such passengers.

Having thus described the invention what is claimed as new and desired to be secured by Letters Patent is:

1. Safety apparatus for a transportation vehicle comprising a retracting device and a holder, each adapted for mounting on the vehicle in spaced relationship adjacent a seat; belting secured at one end thereof to said device and normally adapted to span the distance between the device and said holder across the waist of an occupant of said seat; releasable lock means for restraining said device against paying out excess belting; latch means for attaching the opposite end of the belting to the holder, said latch means being releasable, whereby the belting may be retracted by said device; and manually manipulable means at said opposite end of the belting and operably coupled with said lock means for releasing the latter.

2. Safety apparatus for a transportation vehicle comprising a retracting device and a holder, each adapted for mounting on the vehicle in spaced relationship adjacent a seat; belting secured at one end thereof to said device and normally adapted to span the distance between the device and said holder across the waist of an occupant of said seat; releasable lock means for restraining said device against paying out excess belting; releasable latch means for attaching the opposite end of the belting to the holder; and manually manipulable means common to the lock means and the latch means for releasing the same, whereby the belting may be retracted by said device.

3. Safety apparatus for a transportation vehicle comprising a retracting device and a holder, each adapted for mounting on the vehicle in spaced relationship adjacent a seat; belting secured at one end thereof to said device and normally adapted to span the distance between the device and said holder across the waist of an occupant of said seat; releasable lock means for restraining said device against paying out excess belting; an inflatable element for releasing said lock means; manually manipulable pump means operably coupled with said element for inflating the latter; and latch means for attaching the opposite end of the belting to the holder, said latch means being releasable, whereby the belting may be retracted by said device upon release of the lock means.

4. Safety apparatus for a transportation vehicle comprising a retracting device and a holder, each adapted for mounting on the vehicle in spaced relationship adjacent a seat; belting secured at one end thereof to said device and normally adapted to span the distance between the device and said holder across the waist of an occupant of said seat; releasable lock means for restraining said device against paying out excess belting; an inflatable element for releasing said lock means; pump means operably coupled with said element for inflating the latter; and latch means for attaching the opposite end of the belting to the holder, said latch means having a manually manipulable member for releasing the same and actuating said pump means, whereby the belting may be retracted by said device upon release of the lock means.

5. Safety apparatus for a transportation vehicle comprising a rotatable reel and a holder, each adapted for mounting on the vehicle in spaced relationship adjacent a seat; lock means operably connected with the reel for holding the same against rotation; a belt secured at one end thereof to said reel and normally adapted to span the distance between the reel and the holder across the waist of an occupant of the seat; latch means at the opposite end of the belt for attaching the same to the holder; manually manipulable means at said opposite end of the belt and operably coupled with said lock means for releasing the latter; and power means coupled with the reel for rotating the latter in one direction to wind the belt on the reel upon release of said latch means and said lock means.

6. Safety apparatus for a transportation vehicle comprising a rotatable reel and a holder, each adapted for mounting on the vehicle in spaced relationship adjacent a seat; lock means operably connected with the reel for holding the same against rotation; a belt secured at one end thereof to said reel and normally adapted to span the distance between the reel and the holder across the waist of an occupant of the seat; latch means at the opposite end of the belt for attaching the same to the holder; an inflatable element for releasing said lock means; manually manipulable pump means at said opposite end of the belt for inflating said element, there being a bore in said belt operably interconnecting said element and said pump means; and power means coupled with the reel for rotating the latter in one direction to wind the belt on the reel upon release of said latch means and said lock means.

7. Safety apparatus for a transportation vehicle comprising a rotatable reel and a holder, each adapted for mounting on the vehicle in spaced relationship adjacent a seat; lock means operably connected with the reel for holding the same against rotation, said lock means including a stationary, toothed gear, and a spring-loaded, toothed pawl swingably mounted on the reel; a belt secured at one end thereof to said reel and normally adapted to span the distance between the reel and the holder across the waist of an occupant of the seat; latch means at the opposite end of the belt for attaching the same to the holder; an inflatable element for swinging the pawl out of engagement with said gear; manually manipulable pump means at said opposite end of the belt for inflating said element, there being a bore in said belt operably interconnecting said element and said pump means; and power means coupled with the reel for rotating the latter in one direction to wind the belt on the reel upon release of said latch means and said lock means.

8. Safety apparatus for a transportation vehicle comprising a rotatable reel and a holder, each adapted for mounting on the vehicle in spaced relationship adjacent a seat; lock means operably connected with the reel for holding the same against rotation, said lock means including a stationary, toothed gear, and a spring-loaded, toothed pawl swingably mounted on the reel; a belt secured at one end thereof to said reel and normally adapted to span the distance between the reel and the holder across the waist of an occupant of the seat; latch means at the opposite end of the belt for attaching the same to the holder, said latch means having a swingable actuator; an inflatable element for swinging the pawl out of engagement with said gear; a pneumatic squeeze bulb within the path of travel of said actuator for inflating said element, there being a bore in said belt operably interconnecting said element and said squeeze bulb; and power means coupled with the reel for rotating the latter in one direction to wind the belt on the reel upon release of said latch means and said lock means.

References Cited in the file of this patent
UNITED STATES PATENTS

| | | |
|---|---|---|
| 2,480,915 | George | Sept. 6, 1949 |
| 2,488,858 | Franz | Nov. 27, 1949 |
| 2,650,655 | Neahr, et al. | Sept. 1, 1953 |
| 2,664,140 | Kindelberger | Dec. 29, 1953 |
| 2,725,097 | Thoreson | May 29, 1955 |